Oct. 27, 1931.   N. S. CLAY   1,829,437
PROPELLER
Filed Dec. 9, 1927
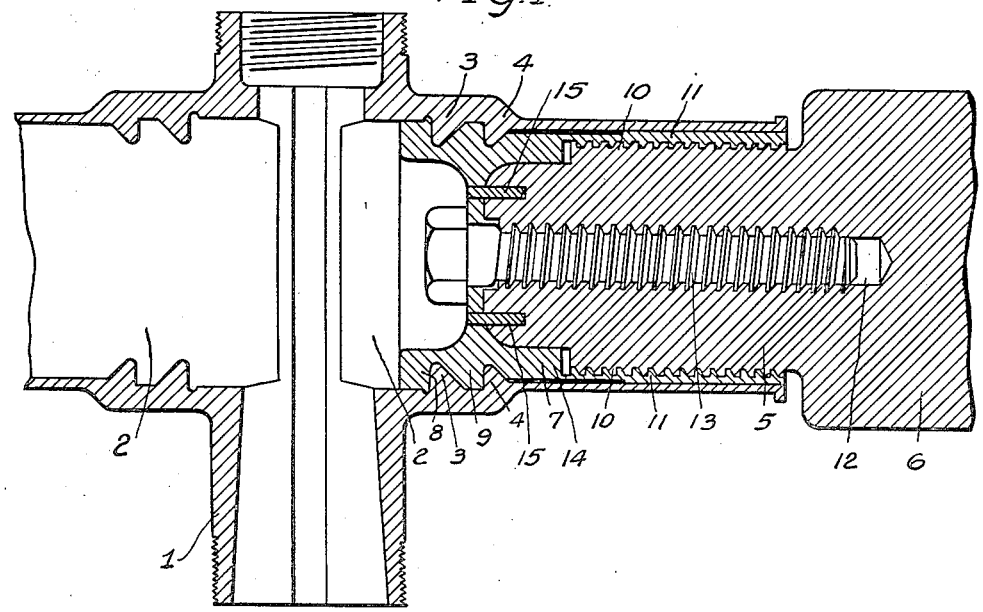
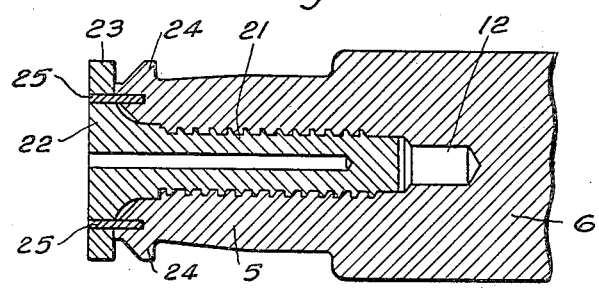
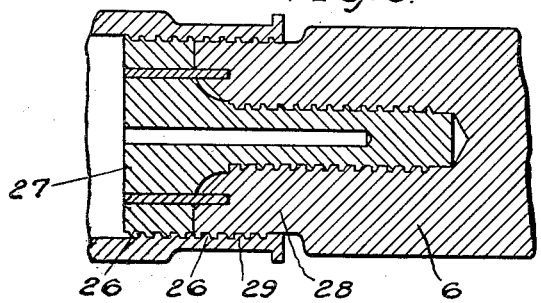
INVENTOR
Noble S. Clay.
BY
Wesley G. Barr
ATTORNEY Patented Oct. 27, 1931

1,829,437

UNITED STATES PATENT OFFICE

NOBLE S. CLAY, OF WILKINSBURG, PENNSYLVANIA, ASSIGNOR TO WESTINGHOUSE ELECTRIC & MANUFACTURING COMPANY, A CORPORATION OF PENNSYLVANIA

PROPELLER

Application filed December 9, 1927. Serial No. 238,842.

My invention relates to airplane propellers and it has particular relation to airplane propellers of the adjustable-blade type.

The majority of present-day airplane propellers severally comprise essentially three parts, a hollow hub portion and two alined blade members adjustably secured to the hub portion. These propellers revolve at high speeds and, consequently, extreme centrifugal force is produced. As a result, the propeller blades may be thrown out of the central hub, thereby causing destructive results in the airplane motor and framework of the airplane because of unbalance.

My invention, therefore, is directed to means for fastening propeller blades to the hub, whereby the fastening means is made considerably stronger than heretofore.

Another object of my invention is to provide a propeller which is simple in construction, easily adjusted, and reliable in operation.

Other objects of my invention will become apparent from the following description of my device, taken in conjunction with the accompanying drawings, wherein Figure 1 is a fragmentary view, in longitudinal section, of a propeller utilizing my fastening means, Fig. 2 is a similar view of a modification of my fastening means, and Fig. 3 is a similar view of still another modification of my fastening means.

Referring to Fig. 1, I prefer to utilize the two-piece propeller hub 1 known to the art, in which two openings 2, extending at right angles to the center line of revolution of the hub, are provided with a plurality of inwardly projecting flanges 3 and 4 having their inner faces perpendicular to the line of stress and their outer faces at approximately 45° with respect to the line of stress.

In the modification shown in Fig. 1, the stub end 5 of a propeller blade 6 has been machined down to such dimensions that a metal bushing or cup 7 provided with peripheral flanges 8 and 9 to engage the flanges 3 and 4, respectively, of the propeller hub, may be fitted over the stub 5. The stub is provided with external buttress threads 10 so disposed that they are at right angles to, and resist the stress caused by centrifugal force on the blade. The threads 10 engage corresponding threads 11 on the internal surface of bushing 7.

The inner portion of the stub is drilled and tapped to provide a suitable opening 12 for inserting an additional fastening means, such as bolt 13, the head of which engages the inner or closed end of bushing 7.

The bushing 7 is further provided with a shoulder portion 14 to constitute a bearing member for stub 5 when the blade is fastened in the bushing.

To prevent relative rotative movement of the bushing 7 and blade 6, dowel pins 15 are inserted through the end face of bushing 7 into the stub 5.

In the modifications shown, the blade is machined down to the desired shape and dimensions, but the characteristics of the laminated material preferably employed are such that, as an alternative, the blade may be molded directly into the bushings or about the inserts used.

In fastening the propeller blade 6 to the bushing 7, the blade is screwed down into the bushing by means of threads 10 and 11, until it is tightly engaged. The bolt 13 is then screwed into the propeller blade stub until the bolt-head tightly engages the end face of bushing 7 and shoulder 14.

In a second modification, shown in Fig. 2, a bolt 21 is provided with a large cylindrical head 22 which also constitutes one of the peripheral flanges 23 of the stub 5. The other or outer flange 24 is composed of material like that of the blade. The head 22 is longitudinally drilled to receive a locking pin 25 for preventing rotation of the bolt with respect to the blade.

If desired, external buttress threads 26 (Fig. 3) may be provided on the bolt-head 27 and propeller stub 28 instead of the flanges 23 and 24, shown in Fig. 2, and the structure screwed directly into a suitable internally threaded hub 29.

My propeller construction is particularly suitable for use with molded blades embodying a phenolic condensation product, but may readily be adapted to provide means for anchoring any other type of propeller.

Although I have shown and described a structure which utilizes only two flanges in fastening the blade in the hub, it is apparent that any number of flanges may be used; for instance, in the modification shown in Fig. 2, the bolt 21 and stub 5 may each have two or more flanges.

Although I have described specific embodiments of my invention, I do not wish to be limited thereto, since modifications may be made by those skilled in the art without departing from the spirit and scope of the invention, as defined in the appended claims.

I claim as my invention:

1. In a propeller comprising a hollow hub member and a blade member having a threaded opening therein extending longitudinally thereof, holding means comprising a fastening member engaging the hub member and threaded directly into the opening in said blade member.

2. In a propeller comprising a hollow hub member and a blade member, holding means comprising a bushing engaged on said blade member and cooperatively engaging said hub member, said bushing and blade member having registering openings therein and a bolt threaded into said opening for further engaging said bushing and said blade member.

3. A propeller comprising a blade having a stub provided with a screw threaded hole, peripheral flanges on said blade stub, a hollow hub, means for engaging said peripheral flanges on said blade stub, a bolt provided with threads and a cylindrical head which constitutes one of said peripheral flanges of said blade stub, locking means for the blade to prevent relative movement between it and the bolt, said blade being provided with another of said peripheral flanges to engage said hub into the hole in the blade.

4. A means of fastening a propeller blade to a hub comprising a threaded bolt having a cylindrical head, a blade stub having a threaded recess to receive said bolt, locking pins inserted through the head of said bolt and into the stub of the blade for preventing relative movement of said parts, the cylindrical head having a flange to hold the blade on said hub, and a second flange on said blade stub to engage a corresponding flange on said hub.

In testimony whereof I have hereunto subscribed my name this 29th day of November, 1927.

NOBLE S. CLAY.